United States Patent
Panchal et al.

(10) Patent No.: US 11,553,463 B2
(45) Date of Patent: Jan. 10, 2023

(54) SYSTEMS AND METHODS OF APPLICATION TO NETWORK SLICE MAPPING

(71) Applicant: Verizon Patent and Licensing Inc., Basking Ridge, NJ (US)

(72) Inventors: Jignesh S. Panchal, Hillsborough, NJ (US); Sudhakar Reddy Patil, Flower Mound, TX (US); Bharadwaj Vemuri, Jersey City, NJ (US); Deepa Jagannatha, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/174,518

(22) Filed: Feb. 12, 2021

(65) Prior Publication Data
US 2022/0264540 A1 Aug. 18, 2022

(51) Int. Cl.
| | |
|---|---|
| *H04W 72/04* | (2009.01) |
| *H04W 12/08* | (2021.01) |
| *H04W 48/18* | (2009.01) |
| *H04W 40/02* | (2009.01) |

(52) U.S. Cl.
CPC ........... *H04W 72/04* (2013.01); *H04W 12/08* (2013.01); *H04W 40/02* (2013.01); *H04W 48/18* (2013.01)

(58) Field of Classification Search
CPC ..... H04W 72/04; H04W 12/08; H04W 40/02; H04W 48/18; H04W 72/048; H04W 72/0406
See application file for complete search history.

(56) References Cited

U.S. PATENT DOCUMENTS

| | | | |
|---|---|---|---|
| 2019/0349838 A1* | 11/2019 | Futaki | H04W 48/08 |
| 2021/0051576 A1* | 2/2021 | Niemi | H04W 8/08 |
| 2021/0385724 A1* | 12/2021 | Wang | H04L 12/1403 |

* cited by examiner

*Primary Examiner* — Wayne H Cai

(57) ABSTRACT

Systems and methods described herein include receiving an indication that an application on a user device has been launched; determining subscription information associated with the user device or a provider of the application, wherein the subscription information includes an indication of one or more recommended network slices to use for traffic associated with the application; and initiating a data session with the user device for sending and receiving the traffic associated with the application via a recommended network slice of the one or more recommended network slices.

20 Claims, 8 Drawing Sheets

SYSTEMS AND METHODS OF APPLICATION TO NETWORK SLICE MAPPING

BACKGROUND

Development and design of radio access networks (RANs) and core networks present certain challenges from a network-side perspective and an end device perspective. For example, with an ever growing number of available applications, it is difficult to map applications to network slices to optimize performance of the applications.

DETAILED DESCRIPTION OF EXAMPLE EMBODIMENTS

Figure 1:
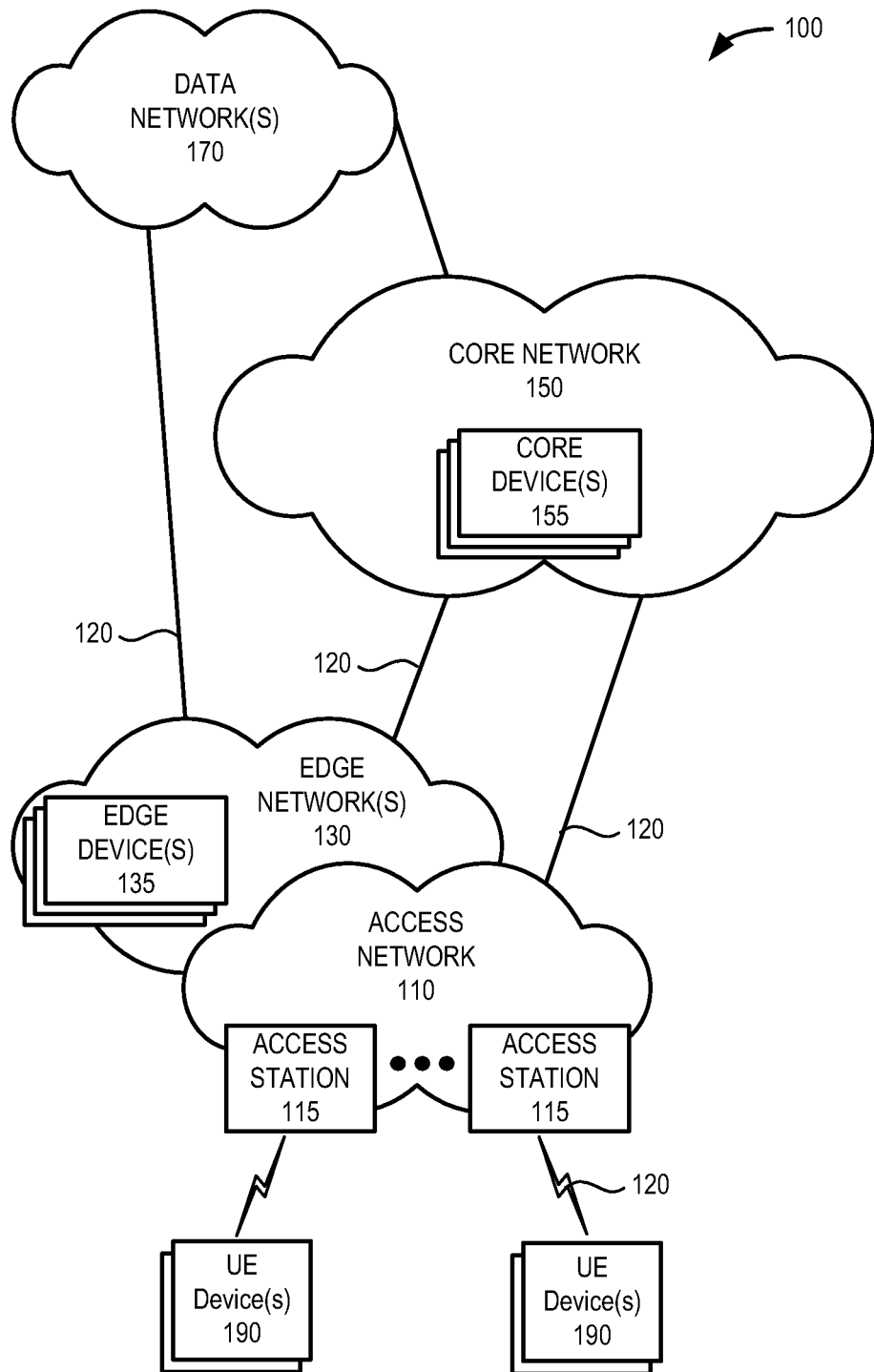
FIG. 1 is a diagram illustrating an exemplary environment in which an exemplary embodiment of an application-based access control service may be implemented.

The following detailed description refers to the accompanying drawings. The same reference numbers in different drawings may identify the same or similar elements. Also, the following detailed description does not limit the invention.

User equipment (UE) devices may execute various applications that generate network traffic with different service requirements. To better manage traffic for different types of applications, UE Route Selection Policies (URSP) have been proposed as a device-side feature in the Fifth Generation (5G) standalone (SA) architecture. The URSP framework provides traffic steering rules for the UE device and enables the UE device to determine how a certain application should be handled in the context of traffic routing to an appropriate network slice. The URSP may be enabled by the policy control function (PCF), which informs the UE of the network slice status via, for example, an access and mobility management function (AMF). A network slice refers to a complete logical network including components of a Radio Access Network (RAN) and Core Network that provide certain telecommunication services and network capabilities that can vary from slice to slice. Selection of network slices for a particular application can, thus, have significant impact on network performance and user experience.

URSP rules, which can be stored anywhere in a UE, are typically stored in the subscriber identity module (SIM) or modem of a UE device. For example, the URSP rules may be available at the UE 5G modem/chipset level. When the upper layers of the UE device (e.g., the device operating system (OS)) determine a slice/packet data unit (PDU) session via which to send application traffic, the UE device 5G modem may evaluate all URSP rules by matching application information to the rules. If a rule matching the application is identified, the slice/PDU session details from the rule are provided to the upper layers of the UE device so that the application traffic may be routed to that slice/PDU session. Ideally, the URSP allows a UE device to match an application, with its specific network service requirements to a specific network slice that is configured to provide the required level of service for the application.

The URSP may use an operating system (OS) ID, an App ID, and/or Internet Protocol (IP) descriptors to define an application and Single-Network Slice Selection Assistance Information (S-NSSAI), Data Network Name (DNN), and Session and Service Continuity (SSC) mode information for the application and network slice mapping. The USRP may be pre-configured in the UE device or may be transmitted to the UE device from the PCF. A pre-configured policy rule may be applied by a UE device, for example, when the UE device has not received a URSP rule from the PCF.

Currently there is no standardized way to identify applications and application requirements across platforms. In addition, with an ever growing number of available applications on multiple mobile platforms, it has become increasingly difficult for a telecommunications network or service provider to manage and map the applications to network slices/PDU sessions. Furthermore, service providers may not have control over the UE device's modem or operating systems. Therefore, it would be beneficial for a service provider to be able to control how applications on a UE device are mapped to slices on the service provider's network.

Systems and methods described herein enable a service provider (e.g., a telecommunications service provider) to control whether an application accesses a particular slice. In one implementation, a partnership or subscription service may be formed between a service provider and a provider of the application or an entity associated with the application. For example, based on the partnership or subscription, a service provider may enable an application to use a particular slice in response to verifying that the application is authorized to use the slice. In another implementation, a user may purchase a subscription plan that allows the user device to access particular slices for particular applications. For example, applications on the user's UE device may be mapped to slices based on the user's subscription plan with a service provider.

FIG. 1 is a diagram illustrating an exemplary environment 100 in which an exemplary embodiment of application to slice mapping may be implemented. As illustrated, environment 100 includes an access network 110, edge networks 130, a core network 150, and one or more data networks 170. Access network 110 includes access stations 115, edge network 130 includes edge devices 135, and core network 150 includes core devices 155. Environment 100 further includes UE devices 190.

The number, the type, and the arrangement of network devices and the number of UE devices 190 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links 120 between the networks, between the network devices, and between UE devices 190 and the network devices. Environment 100 may be implemented to include wired, optical, and/or wireless communication links 120 among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 110 may include one or multiple networks of one or multiple types and technologies. For example, access network 110 may include a Fifth Generation (5G) radio access network (RAN), Fourth Generation (4G) RAN, and/or another type of future generation RAN. By way of further example, access network 110 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 110 may further include other types of wireless networks, such as a WiFi network, a Worldwide Interoperability for Microwave Access (WiMAX) network, a local area network (LAN), or another type of network that may provide an on-ramp to access stations 115 and/or core network 150.

Depending on the implementation, access network 110 may include one or multiple types of access stations 115. For example, access station 115 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 110 may be implemented according to various wireless technologies (e.g., radio access technology (RAT), etc.), wireless standards, wireless frequencies/bands, and so forth. According to an implementation, access stations 115 may include a gNB with multiple distributed components, such as a central unit (CU), a distributed unit (DU), a remote unit (RU or a remote radio unit (RRU)), or another type of distributed arrangement. Access stations 115 (as part of access network 110) may be part of a Self-Organizing Network (SON) that may be reconfigured by another component in networks 110, 130, and/or 150.

Edge network 130 includes a platform that provides application services at the edge of a network, such as application services for UE devices 190. For example, edge network 130 may be implemented as a Multi-access Edge Compute (MEC) platform. Edge network 130 may be implemented using one or multiple technologies including, for example, network function virtualization (NFV), software defined networking (SDN), cloud computing, or another type of network technology. Edge network 130 may include network devices (e.g., edge devices 135) located to provide geographic proximity to various groups of access stations 115. In some embodiments, components of edge network 130 may be co-located with access station 115 in access network 110. In other embodiments, access stations 115 may connect to edge network 130 via wired (e.g., optical) backhaul links 120.

Core network 150 may include one or multiple networks of one or multiple types and technologies. According to an exemplary embodiment, core network 150 includes a complementary network associated with access network 110. For example, core network 150 may be implemented to include a next generation core (NGC) for a 5G network. In other implementation, core network 150 may also include an EPC of an LTE, a core network of an LTE-Advanced (LTE-A) network, and/or a core network of an LTE-A Pro network. Core network 150 may also include a legacy core network.

Depending on the implementation, core network 150 may include various types of network devices, such as core devices 155. For example, core devices 155 may include 5G core components and/or combined 4G/5G core components, such as a packet gateway (PGW), a serving gateway (SGW), a home subscriber server (HSS), an authentication, authorization, and accounting (AAA) server, a policy charging and rules function (PCRF), a charging system (CS), a user plane function (UPF), an AMF, a mobility and management entity (MME), a session management function (SMF), a unified data management (UDM) device, an authentication server function (AUSF), a network slice selection function (NSSF), a network repository function (NRF), a PCF, a network exposure function (NEF), and/or an application function (AF). According to other exemplary implementations, core devices 155 may include additional, different, and/or fewer network devices than those described. For example, core devices 155 may include a non-standard and/or proprietary network device. According to an exemplary embodiment, core device 155 includes logic that utilizes a URSP framework, as described herein.

Data network 170 may include one or multiple networks. For example, data network 170 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 170 may include various network devices that provide various applications, services, or other type of UE device assets (e.g., servers (e.g., web, application, cloud, etc.), mass storage devices, data center devices), and/or other types of network services pertaining to various network-related functions.

UE devices 190 may each include a mobile device, such as wireless or cellular telephone device (e.g., a conventional cell phone with data processing capabilities), a smart phone, a personal digital assistant (PDA) that can include a radiotelephone, etc. In another implementation, UE device 190 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UE devices 190 may be implemented as a machine-type communications (MTC) device, an Internet of Things (IoT) device, a machine-to-machine (M2M) device, etc., that includes communication functionality, such as a home appliance device, a home monitoring device, a camera, etc. UE devices 190 may connect to access stations 115 in a wireless manner. As described further herein, UE devices 190 may work within a URSP framework to locally map applications to network slices during an attachment procedure to route traffic for an application to an appropriate network slice.

Figure 2:
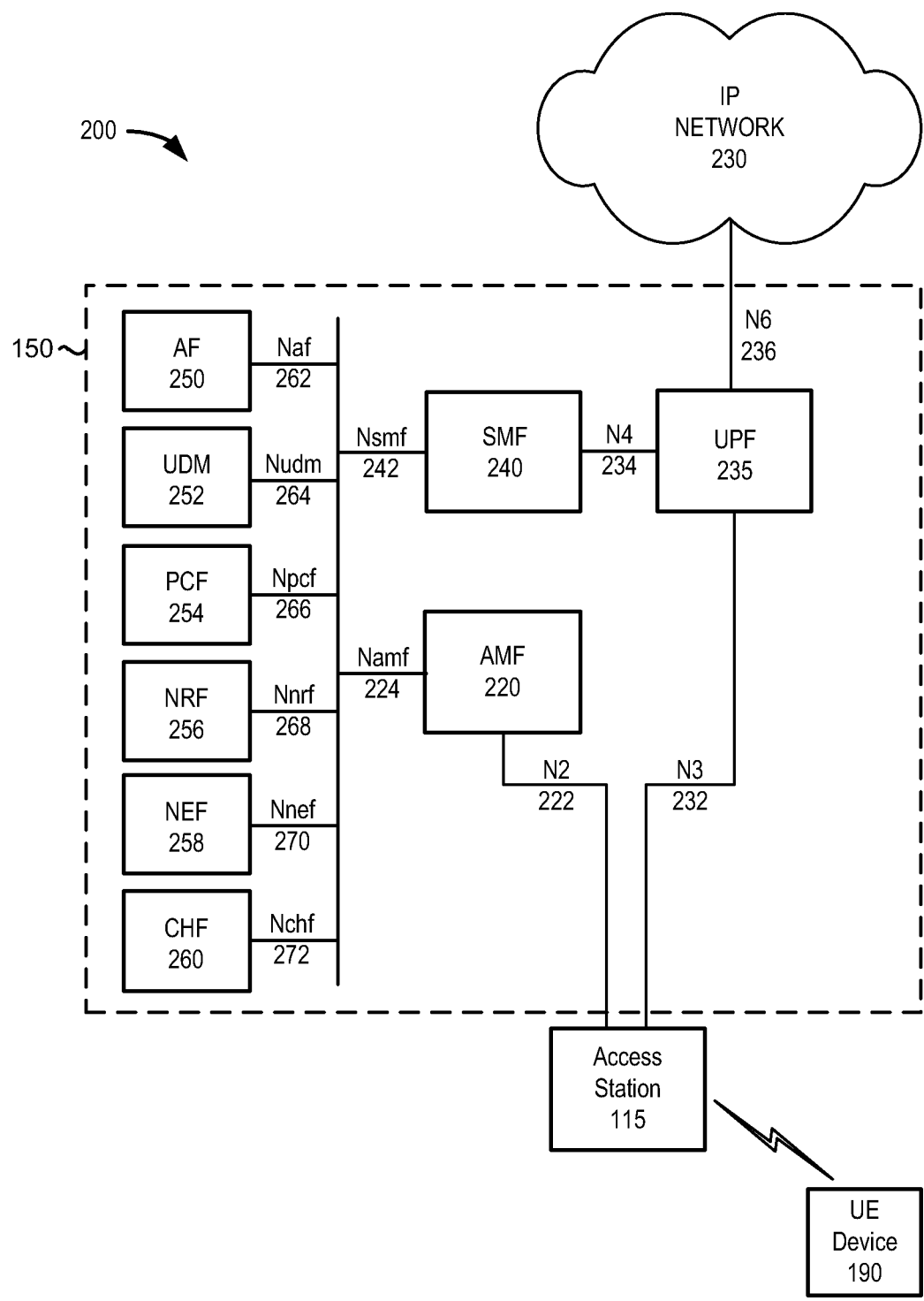
FIG. 2 is a diagram illustrating a network environment that includes exemplary components of an environment of FIG. 1 according to an implementation described herein.

FIG. 2 is a diagram illustrating a network environment 200 that includes exemplary components of environment 100 according to an implementation described herein. As shown in FIG. 2, network environment 200 may include UE device 190, access station 115, core network 150, and an IP network 230.

Core network 150 may include core devices 155, such as an Access and Mobility Management Function (AMF) 220, a UPF 235, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, and a Charging Function (CHF) 260. AMF 220, UPF 235, SMF 240, AF 250, UDM 252, PCF 254, NRF 256, NEF 258, and CHF 260 may each be implemented as separate network devices or as nodes shared among one or more network devices. While FIG. 2 depicts a single AMF 220, UPF 235, SMF 240, AF 250, UDM 252, PCF 254, NRF 256, NEF 258, and CHF 260 for illustration purposes, in practice, FIG. 2 may include multiple access stations 115, AMFs 220, UPFs 235, SMFs 240, AFs 250, UDMs 252, PCFs 254, NRFs 256, NEFs 258, and/or CHFs 260.

As discussed above, access station 115 may include one or more devices and other components and functionality that enable UE device 190 to wirelessly connect to access station 115 using 5G Radio Access Technology (RAT). Access station 115 may communicate with AMF 220 using an N2 interface 222 and communicate with UPF 235 using an N3 interface 232.

AMF 220 may perform registration management, connection management, reachability management, mobility management, lawful intercepts, Short Message Service (SMS) transport between UE device 190 and an SMS function (not shown in FIG. 2), session management messages transport between UE device 190 and SMF 240, access authentication and authorization, location services management, functionality to support non-3GPP access networks, and/or other types of management processes. AMF 220 may be accessible by other function nodes via a Namf interface 224.

UPF 235 may maintain an anchor point for intra/inter-RAT mobility, maintain an external PDU point of interconnect to a data network (e.g., IP network 230, etc.), perform packet routing and forwarding, perform the user plane part of policy rule enforcement, perform packet inspection, perform lawful intercept, perform traffic usage reporting, perform quality of service (QoS) handling in the user plane, perform uplink traffic verification, perform transport level packet marking, perform downlink packet buffering, send and forward an "end marker" to a RAN node (e.g., access station 115), and/or perform other types of user plane processes. UPF 235 may communicate with SMF 240 using an N4 interface 234 and connect to IP network 230 using an N6 interface 236.

SMF 240 may perform session establishment, modification, and/or release, perform IP address allocation and management, perform Dynamic Host Configuration Protocol (DHCP) functions, perform selection and control of UPF 235, configure traffic steering at UPF 235 to guide traffic to the correct destination, terminate interfaces toward PCF 254, perform lawful intercepts, charge data collection, support charging interfaces, control and coordinate charging data collection, termination of session management parts of Non-Access Stratum (NAS) messages, perform downlink data notification, manage roaming functionality, and/or perform other types of control plane processes for managing user plane data. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for UE devices 190, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may receive subscription information from UDM 252 and interface with AMF 220 to manage the mobility context and SMF 240 to manage the session contexts. PCF 254 may play a crucial role in providing a schema for network slicing and roaming. PCF 254 may trigger the URSP, which enables UE device 190 to determine how an application should be handled in the context of an existing or new PDU session. PCF 254 may set a traffic steering policy for steering subscriber traffic to appropriate service functions. PCF 254 may receive slice specific analytics from Network Data Analytics Function (NWDAF) (not shown), an analytics service that provides network wide analytics. PCF 254 may be accessible via Npcf interface 266.

NRF 256 may support a service discovery function and maintain a profile of available network function (NF) instances and their supported services. NRF 256 may be accessible via an Nnrf interface 268.

NEF 258 may expose capabilities and events to other NFs, including third-party NFs, AFs, edge computing NFs, and/or other types of NFs. Furthermore, NEF 258 may secure provisioning of information from external applications to access network 110, translate information between access network 110 and devices/networks external to access network 110, support a Packet Flow Description (PFD) function, and/or perform other types of network exposure functions. NEF 258 may be accessible via Nnef interface 270.

CHF 260 may provide an interface to a converged charging system (CCS). CHF 260 may provide spending limits and quotas for services to SMF 240 and may collect usage information from SMF 240 for online and offline services. CHF 260 may be accessible via Nchf interface 272.

IP network 230 may include a communication network that uses IP to send and receive messages between one or more devices. IP network 230 may be accessible via N6 interface 236.

Although FIG. 2 shows exemplary components of core network 150, in other implementations, core network 150 may include fewer components, different components, differently arranged components, or additional components than depicted in FIG. 2. Additionally or alternatively, one or more components of core network 150 may perform functions described as being performed by one or more other components of core network 150. For example, core network 150 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), a 5G Equipment Identity Register (5G-EIR) function, a Location Management Function (LMF), a Security Edge Protection Proxy (SEPP) function, a Network Slice Selection Function (NSSF) and/or other types of functions. Furthermore, while particular interfaces have been described with respect to particular function nodes in FIG. 2, additionally or alternatively, core network 155 may include a reference point architecture that includes point-to-point interfaces between particular function nodes.

Figure 3:
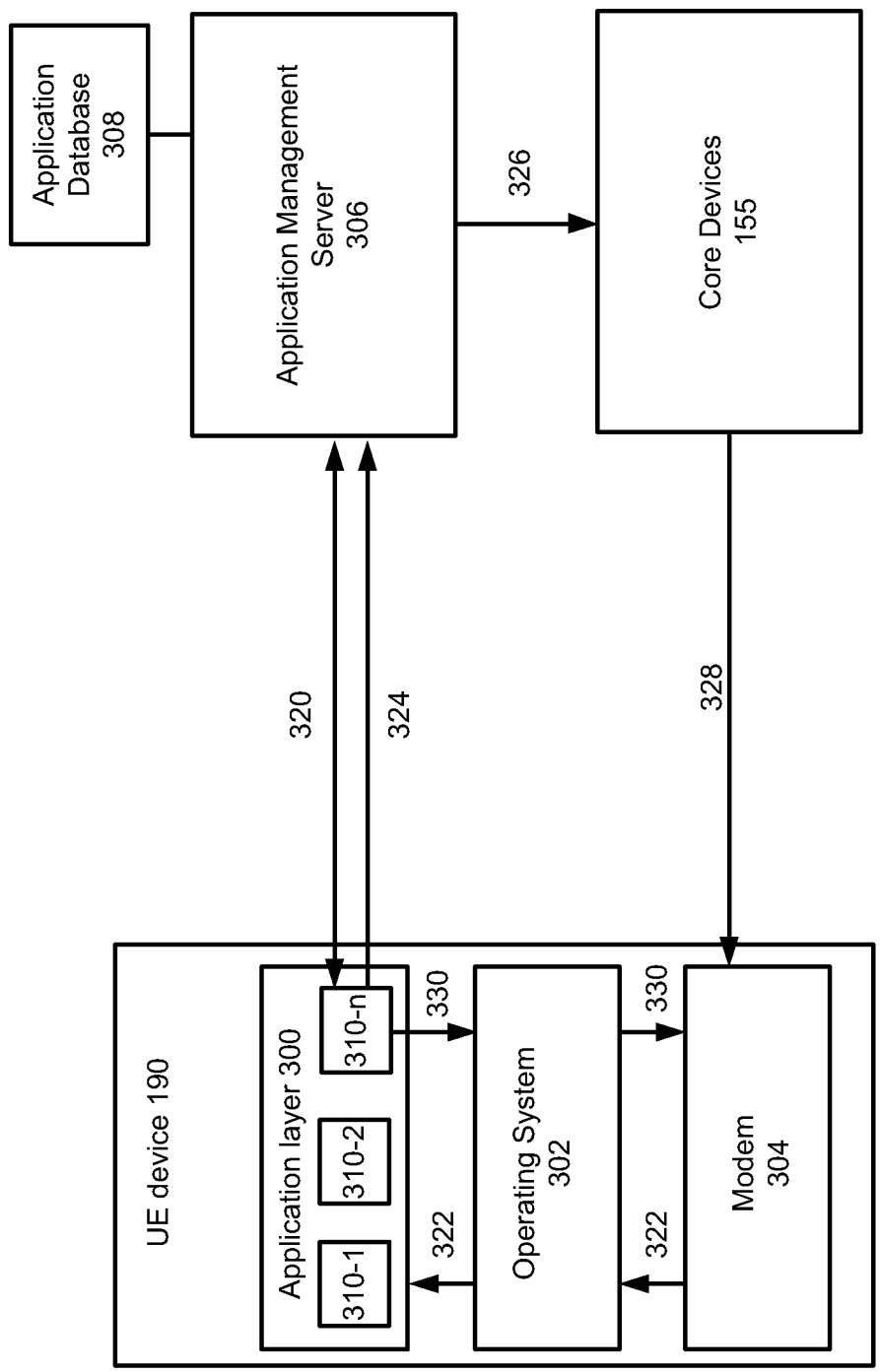
FIG. 3 is a diagram illustrating a slice mapping process based on a partnership formed between an application provider and a service provider.

FIG. 3 is a diagram illustrating a slice mapping process based on an agreement or a partnership formed between an entity associated with an application on UE device 190 and a service provider. FIG. 3 includes UE device 190, application management server 306, application database 308, and core device 155 (e.g., AMF, PCF, etc.).

As shown in FIG. 3, UE device 190 may include an application layer 300, an operating system 302, and a modem 304. Application layer 300 may include multiple applications 310-1 through 310-n that may require network connectivity (referred to collectively and generically as "application 310"). Operating system 302 may include software to perform various functions, such as provide memory management, provide a file system interface, manage time sharing of hardware resources, and provide an environment within which an application 310 can operate. Operating system 302 may be stored in a non-volatile memory device (e.g., a flash memory) or other suitable storage device. According to an implementation described herein, operating system 302 may pass application information to modem 304 to initiate an attachment procedure for UE device 190 on behalf of an application 310.

Modem 304 may be configured to communicate with access station 115. For example, modem 304 may generate baseband signals and convert the generated baseband signal into RF signals to send to access station 115 and may receive RF signals from access station 115 and convert the received RF signals into baseband signals. Modem 304 may maintain a database of active communication sessions established via access station 115 and may store information identifying a QoS class or network slice associated with each active communication session. Modem 304 may store URSP rules for routing traffic from applications 310 to networks using network slices.

Applications 310 may be stored as software in a memory of UE device 190. Each application 310 may have a set of QoS requirements for the application. In the example shown in FIG. 3, a provider of (or other entity associated with) application 310 may have established a partnership or relationship or subscription service with a service provider associated with application management server 306 and core devices 155. For example, the partnership or subscription may guarantee that application 310 may access a network (such as edge network 130 or data network 170) via a particular slice. In one implementation, the provider or other entity associated with application 310 may purchase a subscription with the service provider that guarantees that application 310 may access the network via a particular slice or any slice that provides a particular QoS (e.g., a slice with low latency, a slice with high bandwidth, etc.).

In one implementation, when a provider or entity associated with application 310 forms a partnership with the service provider, information associated with the application 310 may be stored in application database 308. For example, application management server 306 may receive information associated with application 310 (e.g., information used to authenticate application 310, information indicating requirements associated with application 310, an indication of slices application 310 is authorized to use, etc.) and may store the information in application database 308. If a provider or entity associated with application 310 does not form a partnership with the service provider, application database 308 may not store information associated with application 310 and application 310 may initiate a PDU session to connect to the network using a default slice or any slice that is available or provided by the network.

In the example shown in FIG. 3, the provider or entity associated with application 310 may have formed a partnership with the service provider and information associated with the application 310 may be stored in application database 308. As shown by arrow 320 in FIG. 3, when UE device 190 launches application 310, application 310 may exchange information with application management server 306 in order to authenticate application 310. For example, application 310 may transmit identification information to application management server 306 and application management server 306 may perform a handshaking operation in order to authenticate application 310. Application management server 306 may additionally retrieve from application database 308 an indication of recommended network slices that application 310 is authorized to use and transmit an indication of the recommended slices to application 310. For example, application management server 306 may transmit a network slice identifier (e.g., single network slice selection assistance information (S-NSSAI)) for one or more recommended slices to application 310.

Additionally, as shown by arrows 322 in FIG. 3, modem 304 may pass available and/or allowable slice information to application layer 300 via operating system 302 based on a current URSP stored at modem 304. In order for applications 310 in the application layer 300 to access network slicing policies on modem 304, a link may be created between applications 310 and modem 304. In one implementation, the current URSP may not include the recommended network slices that application 310 is authorized to use based on the agreement with the service provider. For example, the current URSP stored at modem 304 may not have been updated since the partnership was formed. If the current URSP stored at modem 304 does not include an indication of the network slices that application 310 is authorized to use, application 310 may transmit an indication that a recommended slice is not on the list of allowed slices, as shown by arrow 324.

If the recommended slice is not on the list of allowed slices in the URSP stored at modem 304, application management server 306 may request an updated URSP for UE device 190. For example, as shown by arrow 326 of FIG. 3, application management server 306 may send the subscription information associated with application 310 (e.g., identification information, recommended slice information, etc.) and a request for an updated URSP to core devices 155 (i.e., PCF 254). Core devices 155 may update the URSP information and, as shown by arrow 328 in FIG. 3, may transmit the updated URSP including the recommended slice information to be used for traffic associated with application 310 to modem 304 of UE device 190. When UE device 190 receives the updated URSP with the recommended slices, application 310 may access the network via one of the recommended slices. For example, as shown by arrow 330 in FIG. 3, application 310 may trigger a new PDU session for the recommended slice to be used for the traffic associated with application 310.

Figure 4:
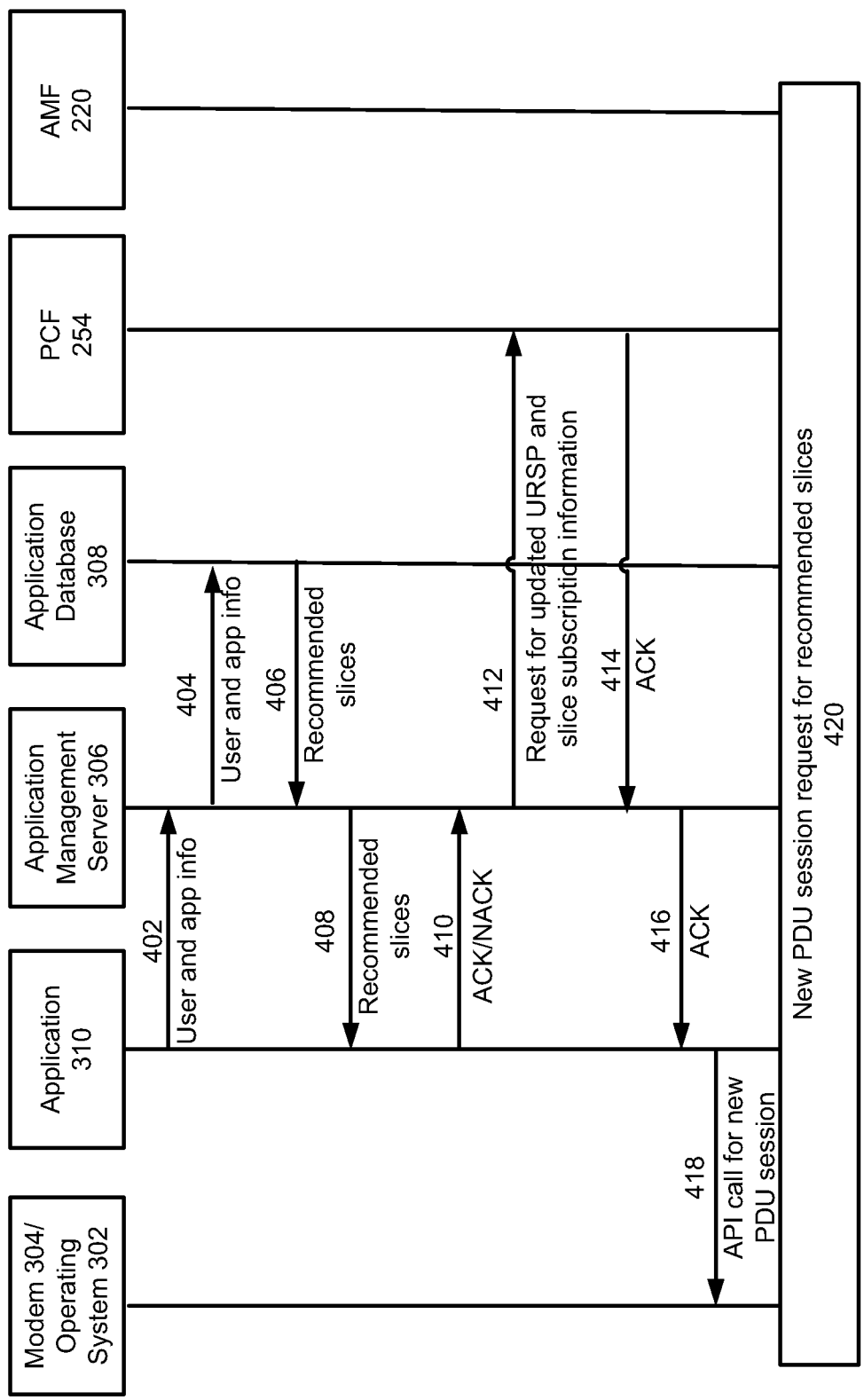
FIG. 4 is a diagram illustrating exemplary communications between devices of FIGS. 1 and 2 for performing slice mapping based on a partnership formed between an application provider and a service provider.

FIG. 4 is a diagram illustrating exemplary messages exchanged among devices illustrated in FIGS. 2 and 3 during a slice mapping process based on a partnership between an entity associated with application 310 and a service provider. FIG. 4 includes modem 304/operating system 302, application 310, application management server 306, application database 308, PCF 254, and AMF 220.

As shown in FIG. 4, application 310 may transmit message 402 including user and application information to application management server 306. For example, application 310 may transmit an identifier associated with application 310 and identification information associated with user device 190 and/or a user of user device 190 that has launched application 310. Application management server 306 may authenticate application 310 and determine that a partnership has been established with a provider or other entity associated with application 310. As shown by arrows 404 and 406 in FIG. 4, using the user and application information, application management server 306 may retrieve, from application database 308, recommended slices for application 310 to use based on the partnership established with application 310. For example, application management server 306 may retrieve slice identifiers (e.g., S-NSSAIs) from application database 308 indicating slices that application 310 may use.

Application management server 306 may transmit message 408 to application 310 on user device 190 including the identifiers of the recommended slices. Application 310 may send acknowledgment (ACK) message 410 indicating that the recommended slices are included in the URSP stored at modem 304 or a non-acknowledgement (NACK) message 410 indicating that the recommended slices are not included in the URSP. If application management server 306 receives NACK message 410 indicating that the recommended slices are not included in the URSP, application management server 306 may transmit message 412 to PCF 254 requesting an updated URSP. Message 412 may additionally include slice subscription information associated with application 310.

PCF 254 may transmit ACK message 414 to application management server 306 indicating that the updated URSP has been created and forwarded to modem 304, as described above in FIG. 3. Application management server 306 may transmit ACK message 416 to application 310 indicating that the updated URSP has been stored at modem 304 and the recommended slices are available to be used by application 310. Based on the partnership established with application 310, application 310 may make Application Programming Interface (API) calls 418 to operating system 302 and modem 304 requesting a new PDU session using one of the recommended slices. Modem 304 and operating system 302 may communicate with AMF 220 and other core devices 155 to request a new PDU session for the recommended slice (420). In this way, application 310 may use an optimal slice for producing the highest quality of service based on a partnership with the service provider.

Figure 5:
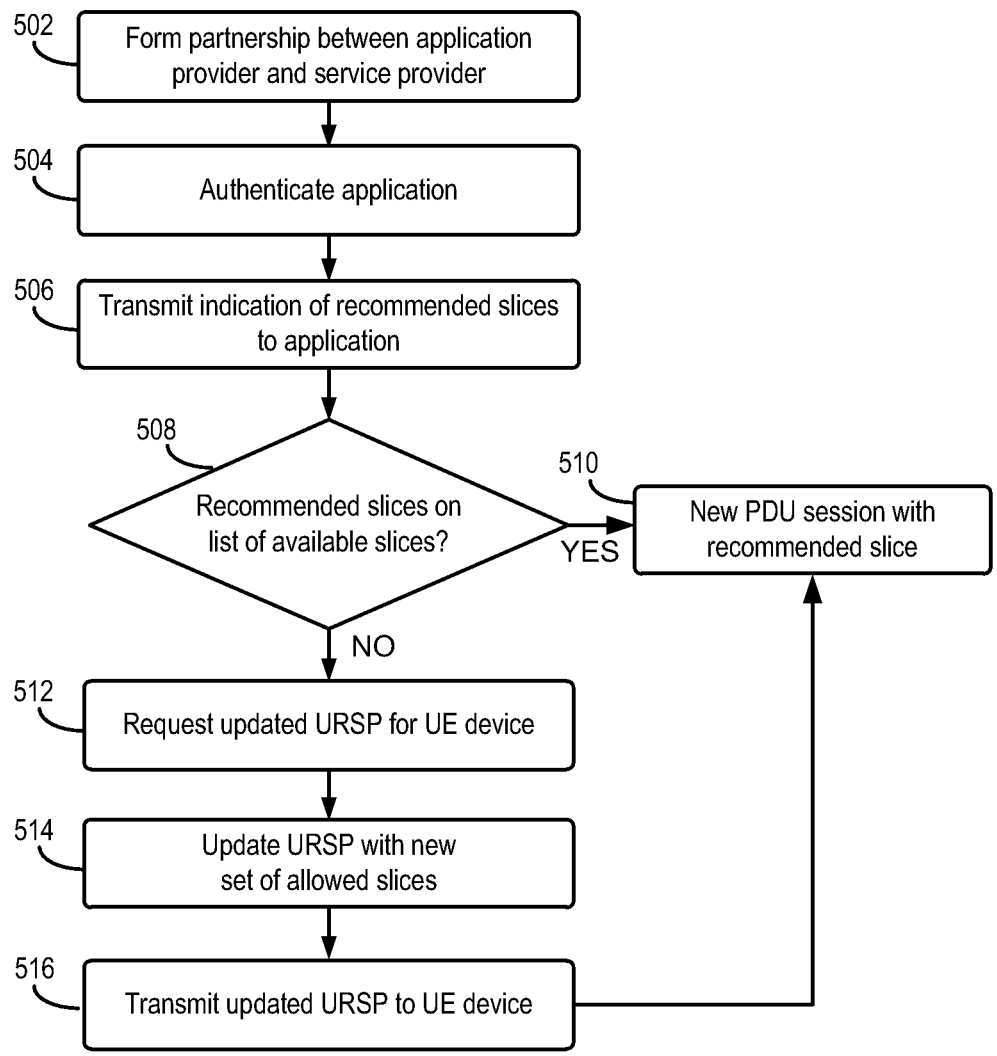
FIG. 5 is a flow diagram illustrating a slice mapping process based on a partnership formed between an application provider and a service provider.

FIG. 5 is a flow diagram illustrating an exemplary process 500 for a slice mapping based on a partnership formed between an entity associated with application 310 on UE device 190 and a service provider. Process 500 may be performed by UE device 190, application management server 306, and core devices 155.

Process 500 may begin with a provider of application 310 forming a partnership or subscription service with a service provider of telecommunications services (block 502). For example, a provider of application 310 or an entity associated with application 310 may form a partnership with the service provider to ensure that application 310 may access a network (e.g., edge network 130, data network 170, IP network 230, etc.) via particular slices. For example, application 310 (e.g., a real-time gaming application) may require a low latency slice, a high bandwidth slice, or a different type of slice in order to optimize performance of application 310 and the partnership may guarantee use of a particular slice when the particular slice is available. In one implementation, the provider of application 310 may purchase a subscription from the service provider to guarantee access to particular slices for application 310.

Process 500 may continue by application management server 306 authenticating application 310 based on receiving identifier information associated with application 310 and UE device 190 (block 504). For example, UE device 190 may launch application 310 in response to a command from a user and application 310 may transmit identification information associated with application 310, UE device 190, and/or a user associated with UE device 190 to application management server 306. Application management server 306 may receive the identification information and may perform a handshaking operation with application 310 to authenticate application 310 and to determine whether a partnership has been formed with a provider of application 310.

When a partnership exists, application management server 306 may determine recommended slices for application 310 to use to access the network and application management server 306 may transmit an indication of the recommended slices to application 310 (block 506). For example, application management server 306 may receive identifiers associated with recommended slices (e.g., S-NSSAIs) from application database 308 based on the partnership and may transmit identifiers associated with the recommended slices to application 310.

Application management server 306 may receive a message from application 310 indicating whether the recommended slices are on the list of allowed slices on the URSP (block 508). For example, application 310 may receive an indication of allowed or available slices from modem 304 based on the URSP stored on modem 304. Application 310 may determine whether the recommended slices are on the list of allowed or available slices and may transmit a message to application management server 306 indicating whether the recommended slices are on the list of allowed or available slices. If the recommended slices are on the list of allowed or available slices (block 508—YES), application 310 may trigger a new PDU or data session for a recommended slice and may connect to the network using the recommended slice (block 510).

If the recommended slices are not on the list of allowed or available slices (block 508—NO), application management server 306 may send a message to PCF 254 requesting an updated URSP for UE device 190 (block 512). For example, application management server 306 may transmit the request for an updated URSP along with information associated with the slice subscription associated with application 310 (e.g., identification information, recommended slices, etc.) to PCF 254. PCF 254 may update the URSP with a new set of allowed slices that include the recommended slices (block 514). Core devices 155 may transmit the updated URSP with the recommended slices to UE 190 (block 516). In one implementation, UE device 190 may receive the updated URSP and store the updated URSP at modem 304. When the updated URSP has been stored at modem 304, application 310 may trigger a new PDU or data session for the recommended slice to be used for traffic associated with application 310 (block 510). Application 310 may exchange information with the network using the recommended slice.

Figure 6:
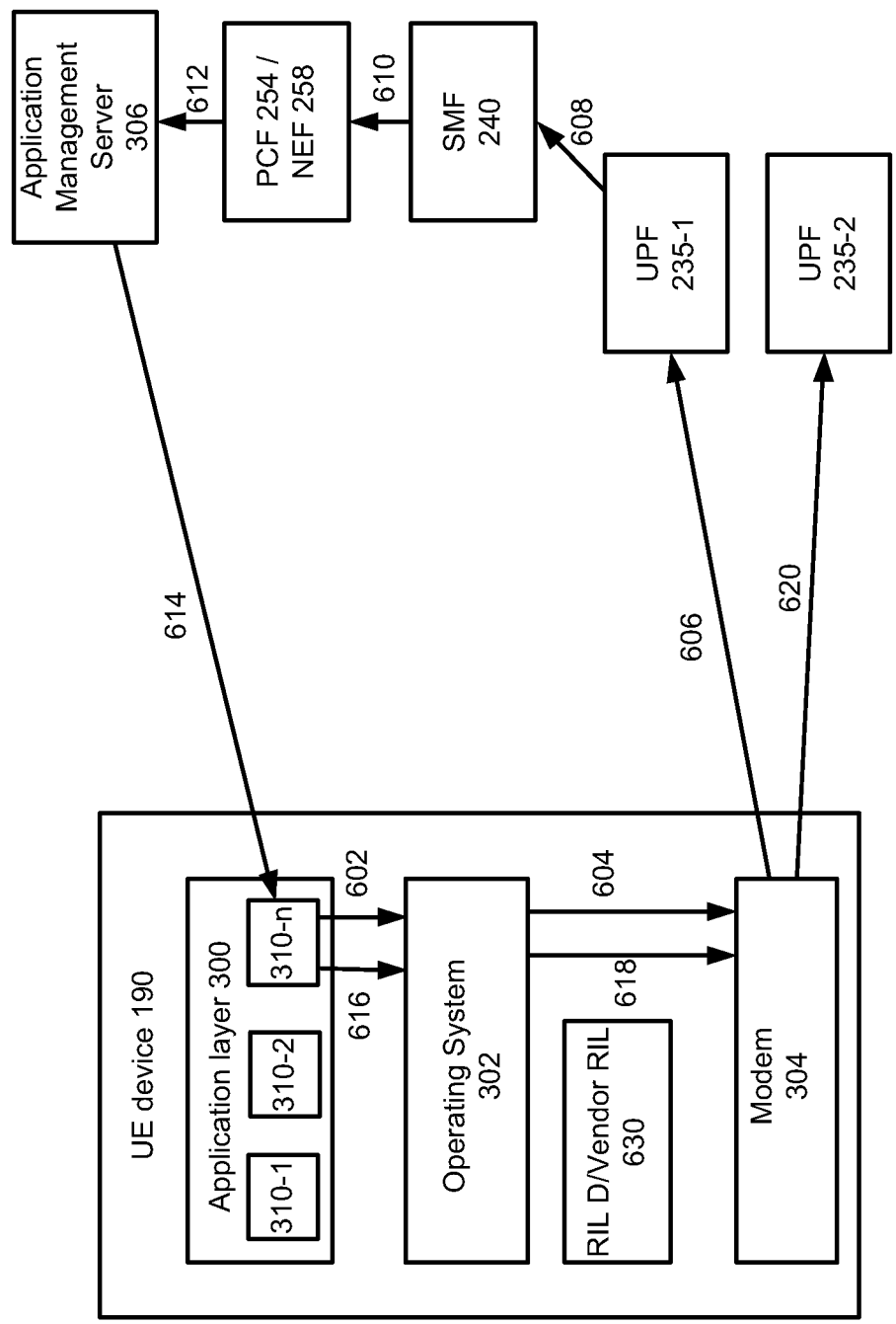
FIG. 6 is a diagram illustrating an exemplary slice mapping process based on a subscription associated with a user device.

FIG. 6 is a diagram illustrating a slice mapping process based on a subscription purchased by a user of UE device 190. FIG. 6 includes UE device 190, UPF 235-1, UPF 235-2, SMF 240, PCF 254/NEF 258, and application management server 306.

In the example shown in FIG. 6, a user of UE device 190 may have subscribed to a level of service that guarantees access to particular slices. For example, the user may have purchased a subscription service that allows applications 310 on UE device 190 to connect to a network using particular slices. If the user has not purchased the subscription service, applications 310 on UE device 190 may connect to the network using a default slice or any slice that is available or provided by the network.

As shown by arrow 602 in FIG. 6, UE device 190 may launch application 310 and application 310 may request to connect to a network. In the example shown in FIG. 6, application 310 may not have access to information regarding slices subscribed to by the user of UE device 190 or certain slices may not be available in specific areas. Therefore, application 310 may request to use a default slice or may not request a specific slice and may indicate a particular domain name network (DNN). As shown by arrows 604 and 606, operating system 302 and modem 304 may create a PDU or data session and may map traffic from application 310 to UPF 235-1 in core network 150 via a default slice. For an Android device or other device, application 310 may be able to request particular slices based on new network capabilities added to Android APIs, as described below.

In one implementation, for an Android device, the radio interface layer (RIL) daemon and vendor RIL on RIL D/Vendor RIL layer 630 may be customized to add new commands for operating system 302 to request the URSP policies to be sent to the operating system 302 framework level. The RIL daemon may be initialized during an Android system boot-up and system properties may be used to find a library to be used for the vendor RIL. The RIL daemon may provide appropriate input to the vendor RIL and may initiate a call to RIL_Init function of the vendor RIL to map the Vendor RIL functions to operating system 302. The vendor RIL is an original equipment manufacturer (OEM) specific radio interface layer that is used across Android devices for modem 304 communications with operating system 302. The vendor RIL includes a library specific to the system on chip vendor that handles communication with radio hardware and dispatches calls to the RIL daemon.

In one implementation, a new RIL request (e.g., RIL_REQUEST_SLICE_NSSAI) may be added to the Android open source project (AOSP) framework to be used when applications 310 on an Android device request a network connection. In addition, new network capabilities may be included in Android APIs. For example, currently applications 310 may request for NET_CAPABILITY_CBS for APPAPN or NET_CAPABILITY_MCX to reach mission critical servers or Class 6 Access Point Name (APN) for Enterprise. According to an implementation herein, AOSP may add capabilities to allow a carrier application to provision new over the top capabilities or maintain a database of capabilities per operator, similar to APN management. Applications 310 may request for operator specific capabilities (e.g., NET_CAPABILITY_VZ_ARXR, NET_CAPABILITY_4K, NET_CAPABILITY_8K, NET_CAPABILITY_VZ_PREMIUM, etc.) when requesting for network connections using Android APIs.

In addition, parameters from the APN database may be passed down through RIL_REQUEST_SETUP_DATA_CALL, RIL_REQUEST_SET_DATA_PROFILE, and RIL_REQUEST_SET_INITIAL_ATTACH_APN. Currently parameters such as APN types, roaming protocol, bearer Radio Access Technologies (RATs), maximum transmission unit (MTU) size, Mobile Virtual Network Operator (MVNO) type, MVNO matched data, and data roaming allowed, etc., are passed down through the RIL to modem 304. In one implementation, the parameters Slice-id or Slice-category may additionally be passed down in the RIL request when application 310 requests a network connection. In this way, applications 310 may be able to request particular slices based on capabilities and requirements of the applications 310. In addition, because application 310 is authenticated by application management server 306, only the applications 310 that are authorized to use the requested slices may be able to use the slices.

Continuing with FIG. 6, PCF 254 may request an indication when traffic from a particular application 310 or application provider has been received at the network (i.e., at UPF 235). In one implementation, PCF 254 may request a notification when traffic with particular traffic characteristics has been received. For example, a partnership may have been formed with a particular application provider or an entity associated with application 310 and PCF 254 may request to be notified when traffic with characteristics consistent with the characteristics of traffic of application 310 has been detected. As shown in FIG. 6, UPF 235-1 may detect the traffic from application 310 and, as shown by arrows 608 and 610, UPF 235-1 may notify SMF 240 that the traffic from application 310 has been detected and SMF 240 may notify PCF 254/NEF 258 that the traffic has been detected.

When PCF 254/NEF 258 receives the indication that the traffic from application 310 has been received, PCF 254/NEF 258 may determine whether the traffic should be mapped to a different slice. For example, PCF 254/NEF 258 may receive an identifier associated with a user of UE device 190, an identifier associated with application 310, and other information associated with the user and/or application 310 (e.g., a current location of UE device 190) and PCF 254/NEF 258 may determine that traffic associated with application 310 should be moved to a different slice. In one implementation, PCF 254/NEF 258 may make the determination to switch the traffic associated with application 310 to a different slice based on determining that the user has purchased a subscription level that allows the user to access the network using the particular slice when using application 310. For example, the subscription may indicate a set of recommended slices that give the best quality of service an optimize performance for application 310. In another implementation, PCF 254/NEF 258 may determine which slices are available (e.g., based on the location of UE device 190) before determining to switch the traffic to a different slice. In the example shown in FIG. 6, PCF 254/NEF 258 may determine to switch the slice used for application 310 from the default slice to one of the recommended slices.

As shown by arrow 612 in FIG. 6, PCF 254/NEF 258 may transmit a message to application management server 306 indicating that the traffic associated with application 310 should be switched to the recommended slice. In addition, the message may indicate an identifier associated with the subscriber (i.e., the user of UE device 190), an identifier associated with application 310, an indication of the recommended slice (e.g., S-NSSAI), and a slice key. The slice key may be used by operating system 302 and modem 304 as an authorization key to access the recommended slice. As shown by arrow 614 of FIG. 6, application management server 306 may notify application 310, in band or out of band, that traffic should be shifted to the recommended slice. Application management server 306 may additionally transmit to application 310 the slice identifier and the slice key. When application 310 receives the indication of the recommended slice and the slice key, application 310 may pass the identifier of the recommended slice, the slice key, and DNN to modem 304 via operating system 302, as shown by arrows 616 and 618 of FIG. 6. Modem 304 may route traffic to UPF 235-2 in core network 150 using the recommended slice, as shown by arrow 620.

The process described with regard to FIG. 6 may ensure that applications 310 that have a relationship with the service provider may be authorized to use particular recommended slices. In addition, by requiring that UE device 190 use the slice key to access the recommended slice, the service provider may ensure that users who have purchased a particular subscription package may be able access the network using the recommended slice.

Figure 7:
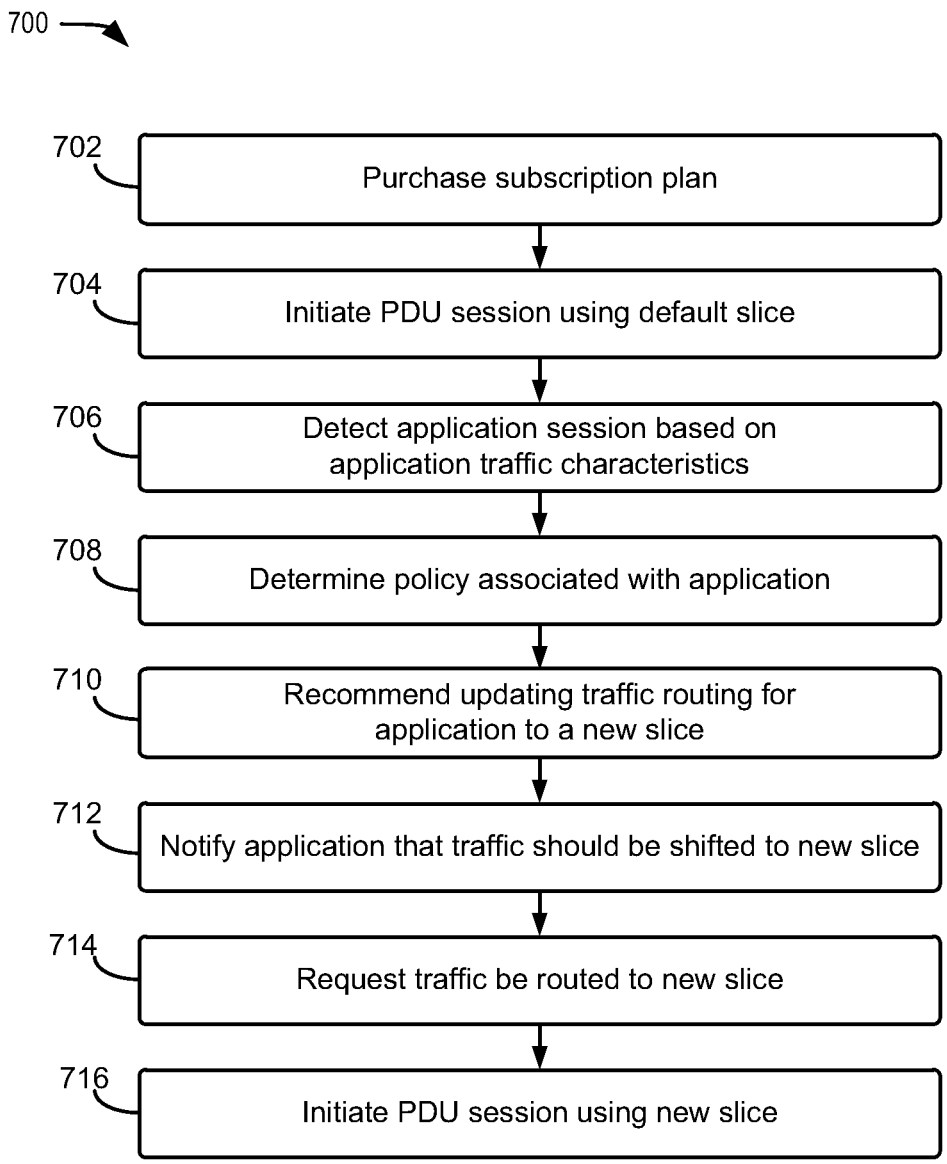
FIG. 7 is a flow diagram illustrating an exemplary process for slice mapping based on a subscription associated with a user device.

FIG. 7 is a flow diagram illustrating an exemplary process 700 for a slice mapping based on a subscription purchased by a user of UE device 190. Process 700 may be performed by UE device 190, application management server 306, and core devices 155.

Process 700 may begin with a user of UE device 190 purchasing a subscription plan from a service provider of a telecommunications service (block 702). For example, the subscription plan may guarantee a particular level of service for applications 310. In one implementation, the service plan may entitle the user to use particular slices for particular applications 310. For example, the subscription plan may allow the user to use low latency slices, high bandwidth slices, etc., for particular applications 310 to optimize performance of the applications 310.

Process 700 may continue with application 310 being launched and triggering a PDU session using a slice (block 704). In one implementation, application 310 may request a default slice or no specific slice for connecting to a network (e.g., edge network 130, data network 170, IP network 230, etc.). Core devices 155 may detect the application session based on application characteristics (block 706). For example, based on a partnership with application providers or based on other means, PCF 254 may request application 310 detection based on application traffic characteristics. In one implementation, UPF 235 may detect traffic associated with application 130 and transmit an indication to PCF 254/NEF 258 that traffic associated with application 310 has been detected.

PCF 254/NEF 258 may determine a policy associated with application 310 (block 708). For example, PCF 254/NEF 258 may determine a policy for application 310 based on a number of factors, such as a location of UE device 190, network slices that are available, the subscription data associated with the user, and/or additional factors. Based on the determined policy, PCF 254/NEF 258 may determine to switch the session associated with application 310 to a new slice. PCF 254/NEF 258 may transmit a recommendation to application management server 306 to update traffic routing for application 310 to a new slice (block 710). In one implementation, PCF 254/NEF 258 may additionally transmit an identifier associated with the subscriber, an identifier associated with application 310, an identifier associated with the recommended new slice (e.g., S-NSSAI), and a slice key.

Application management server 306 may notify application 310 that traffic should be shifted to the new slice (block 712). In one implementation, application management server 306 may transmit to application 310 the identifier associated with the new slice and the slice key. Application 310 may request that traffic be routed to the new slice (block 714). For example, application 310 may forward the slice identifier and the slice key to operating system 302. Operating system 302 may determine, based on the slice key, that application 310 has been given authorization to use the new slice and operating system 302 may direct modem 304 to use the new slice for traffic associated with application 310. Modem 304 may initiate a new PDU session for traffic associated with application 310 using the new slice (block 716).

Figure 8:
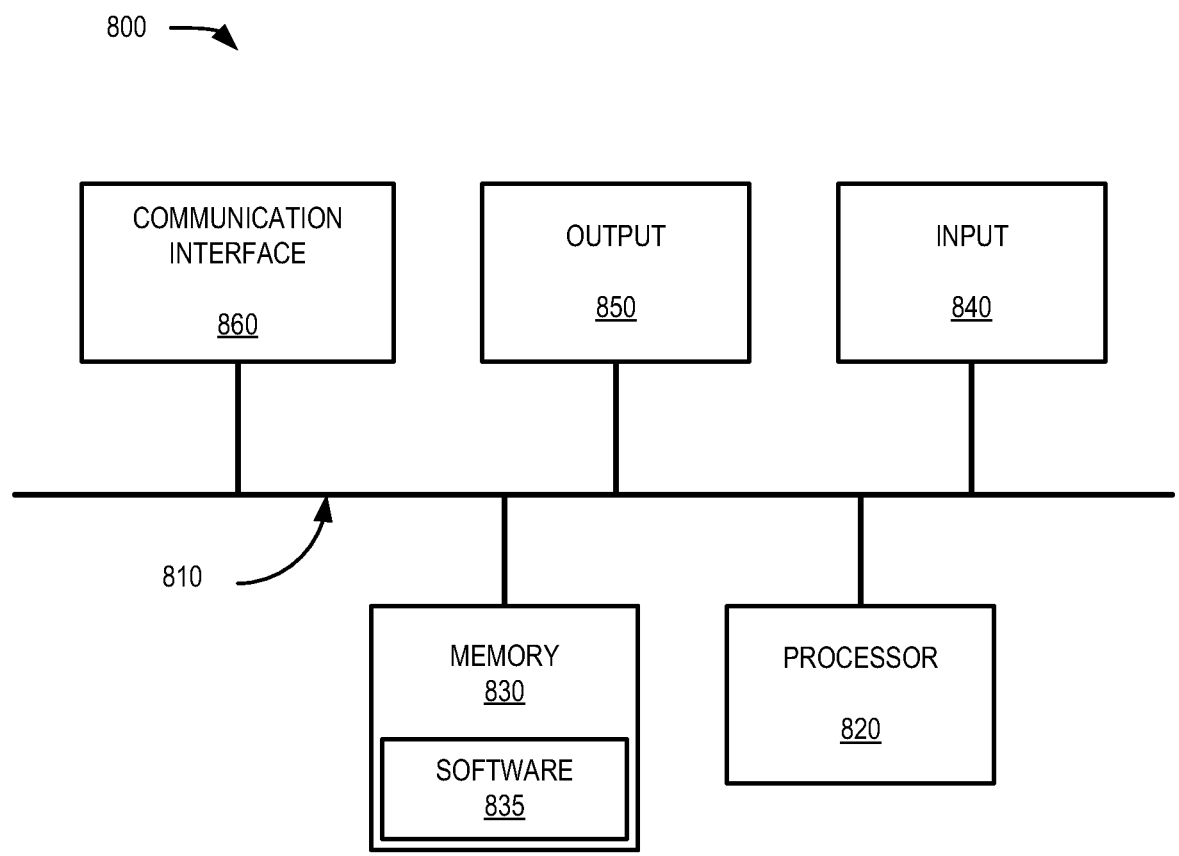
FIG. 8 is a diagram illustrating exemplary components of a device that may correspond to one or more of the devices illustrated and described herein.

FIG. 8 is a diagram illustrating exemplary components of a device 800 that may be included in one or more of the devices described herein. For example, device 800 may correspond to components included in access station 115, core devices 155 (e.g., devices in environment 200), UE device 190, application management server 306, or other devices. As illustrated in FIG. 8, device 800 includes a communications channel 810, a processor 820, a memory 830 with software 835, an input 840, an output 850, and a communication interface 860. According to other embodiments, device 800 may include fewer components, additional components, different components, and/or a different arrangement of components than those illustrated in FIG. 8 and described herein.

Communication channel 810 may include a bus or path that permits communication among the components of device 800. Processor 820 may include a processor, a microprocessor, or processing logic (e.g. an application specific integrated circuit (ASIC), field programmable gate array (FPGA), etc.) that may interpret and execute instructions.

Memory 830 may include one or more types of dynamic storage devices that may store information and instructions, for execution by processor 820, and/or any type of non-volatile storage device that may store information for use by processor 820. With respect to UE device 190, memory 830 includes a memory device that provides URSP services, as described herein. For example, the memory device may be implemented as a SIM card, a universal integrated circuit card (UICC), an embedded UICC (eUICC), a smart card, or another type of storage device. The memory device may include logic that uses the URSP to manage network access to a network (e.g., access network 110, edge network 130, core network 150, etc.), as described herein. For example, the memory device may include an operating system, an application, a program, a module, a script, or other type of entity that may execute instructions to provide the logic of the URSP framework.

Software 835 includes an application or a program that provides a function and/or a process. As an example, with respect to UE device 190 or another network device, software 835 may include code that, when executed by processor 820, provides a function for implementing slice mapping, as described herein. Software 835 may also include firmware, middleware, microcode, hardware description language (HDL), and/or other form of instruction. Software 935 may also be virtualized. Software 835 may further include an operating system (e.g., Windows, Linux, Android, iOS, proprietary, etc.), such as operating system 302.

Input 840 may include a mechanism that permits a user to input information to device 800, such as a keyboard, a keypad, a button, a switch, touch screen, etc. Output 850 may include a mechanism that outputs information to the user, such as a display, a speaker, one or more light emitting diodes (LEDs), etc.

Communication interface 860 permits device 800 to communicate with other devices, networks, systems, and/or the like. Communication interface 860 includes one or multiple wireless interfaces and/or wired interfaces. For example, communication interface 860 may include one or multiple transmitters and receivers, or transceivers. Communication interface 860 may operate according to a protocol stack and a communication standard. Communication interface 860 may include an antenna. Communication interface 860 may include various processing logic or circuitry (e.g., multiplexing/de-multiplexing, filtering, amplifying, converting, error correction, APIs, etc.). Communication interface 860 may be implemented as a point-to-point interface, a service based interface, etc. According to one implementation, communication interface 860 may implement one or more features of modem 304 described above.

Device 800 may perform certain operations in response to processor 820 executing software instructions (e.g., software 835) contained in a computer-readable medium, such as memory 830. A computer-readable medium may be defined as a non-transitory memory device. A non-transitory memory device may include memory space within a single physical memory device or spread across multiple physical memory devices. The software instructions may be read into memory 830 from another computer-readable medium or from another device. The software instructions contained in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

Device 800 may include fewer components, additional components, different components, and/or differently arranged components than those illustrated in FIG. 8. As an example, in some implementations, a display may not be included in device 800. As another example, device 800 may include one or more switch fabrics instead of, or in addition to, communications channel 810. Additionally, or alternatively, one or more components of device 800 may perform one or more tasks described as being performed by one or more other components of device 800.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5 and 7 and a series of steps have been described with regard to the processes illustrated in FIGS. 3, 4, and 6, the order of the blocks and the steps may be modified according to other embodiments. Further, non-dependent blocks and steps may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 820, etc.), or a combination of hardware and software (e.g., software 835).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 820) of a device. A non-transitory storage medium includes one or more of the storage mediums described in relation to memory 830.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
   receiving an indication that an application on a user device has been launched, wherein a provider of the application has been authenticated with a service provider;
   determining a subscription level associated with the provider of the application, wherein the subscription level corresponds to two or more recommended network slices associated with the service provider and for which traffic associated with the application is authorized; and
   initiating, in response to a request from the application, a data session with the user device for sending and receiving the traffic associated with the application via a recommended network slice, determined by detectable characteristics of the traffic which map to the application, from the two or more recommended network slices.

2. The method of claim 1, wherein the request includes an indication of the recommended network slice.

3. The method of claim 1, wherein initiating the data session comprises:
   transmitting the indication of the two or more recommended slices to the application;
   receiving, from the application, an indication that the two or more recommended slices are not on a list of allowed network slices stored in a User Equipment (UE) Route Selection Policy (URSP) at the user device;
   transmitting, to a network device, instructions to update the URSP for the user device based on the two or more recommended slices; and
   initiating the data session based on the updated URSP.

4. The method of claim 3, further comprising:
   transmitting, by the network device, the updated URSP to the user device for storage at the user device.

5. The method of claim 1, wherein initiating the data session includes:
   detecting the traffic associated with the application via a default network slice;
   determining policies associated with the application based on the subscription level;
   determining, based on the policies, that the traffic should be mapped to the recommended network slice;
   transmitting, to the user device, instructions to service the traffic via the recommended network slice; and
   initiating the data session using the recommended network slice.

6. The method of claim 5, wherein the instructions to service the traffic via the recommended network slice include an identifier associated with the recommended network slice and an authorization key associated with the recommended network slice.

7. The method of claim 5, wherein the policies associated with the application are further based on a location of the user device and the two or more recommended network slices.

8. A system comprising:
   one or more processors configured to:
      receive an indication that an application on a user device has been launched, wherein a provider of the application has been authenticated with a service provider;
      determine a subscription level associated with the provider of the application, wherein the subscription level corresponds to two or more recommended network slices associated with the service provider and for which traffic associated with the application is authorized; and
      initiate, in response to a request from the application, a data session with the user device for sending and receiving the traffic associated with the application via a recommended network slice, determined by detectable characteristics of the traffic which map to the application, from the two or more recommended network slices.

9. The system of claim 8, wherein the request includes an indication of the recommended network slice.

10. The system of claim 8, wherein initiating the data session, the one or more processors are further configured to:
    transmit the indication of the two or more recommended slices to the application;
    receive, from the application, an indication that the two or more recommended slices are not on a list of allowed network slices stored in a User Equipment (UE) Route Selection Policy (URSP) at the user device;
    transmit, to a network device, instructions to update the URSP for the user device with the two or more recommended slices; and
    initiate the data session based on the updated URSP.

11. The system of claim 10, wherein the one or more processors are further configured to:
    transmit the updated URSP to the user device for storage at the user device.

12. The system of claim 8, wherein initiating the data session, the one or more processors are further configured to:
    detect the traffic associated with the application via a first default network slice;
    determine policies associated with the application based on the subscription information level;
    determine, based on the policies, that the traffic should be mapped to the recommended network slice;
    transmit, to the user device, instructions to service the traffic via the recommended network slice; and
    initiate the data session based on the recommended slice.

13. The system of claim 12, wherein the instructions to service the traffic via the recommended network slice include an identifier associated with the recommended network slice and an authorization key associated with the recommended slice.

14. A non-transitory computer-readable storage medium storing instructions executable by one or more processors, the instructions comprising:
    one or more instructions that, when executed by the one or more processors, cause the one or more processors to:

receive an indication that an application on a user device has been launched, wherein a provider of the application has been authenticated with a service provider;

determine a subscription level associated with the provider of the application, wherein the subscription level corresponds to two or more recommended network slices associated with the service provider and for which traffic associated with the application is authorized; and initiate, in response to a request from the application, a data session with the user device for sending and receiving the traffic associated with the application via a recommended network slice, determined by detectable characteristics of the traffic which map to the application, from the two or more recommended network slices.

15. The non-transitory computer-readable storage medium of claim 14, wherein the request includes an indication of the recommended network slice.

16. The non-transitory computer-readable storage medium of claim 14, wherein the one or more instructions that cause the one or more processors to initiate the data session include one or more instructions that cause the one or more processors to:

transmit the indication of the two or more recommended slices to the application;

receive, from the application, an indication that the two or more recommended slices are not on a list of allowed network slices stored in a User Equipment (UE) Route Selection Policy (URSP) at the user device;

transmit instructions to update the URSP for the user device with the two or more recommended slices; and initiate the data session based on the updated URSP.

17. The non-transitory computer-readable storage medium of claim 16, wherein the instructions further comprise one or more instructions that cause the one or more processors:

transmit the updated URSP to the user device for storage at a modem of the user device.

18. The non-transitory computer-readable storage medium of claim 14, wherein the one or more instructions that cause the one or more processors to initiate the data session include one or more instructions that cause the one or more processors to:

detect traffic associated with the application via a default network slice;

determine policies associated with the application based on the subscription level;

determine that the traffic should be mapped to the recommended network slice based on the policies;

transmit, to the user device, instructions to service the traffic via the recommended network slice; and initiate the data session based on the recommended slice.

19. The non-transitory computer-readable storage medium of claim 18, wherein the instructions to service the traffic via the recommended network slice include an identifier associated with the recommended network slice and an authorization key associated with the recommended slice.

20. The non-transitory computer-readable storage medium of claim 18, wherein the policies associated with the application are further based on a location of the user device and the two or more recommended network slices.

* * * * *